Jan. 6, 1953
J. FRANKLIN
2,624,400
RESERVE FUEL TANK
Filed Sept. 26, 1949
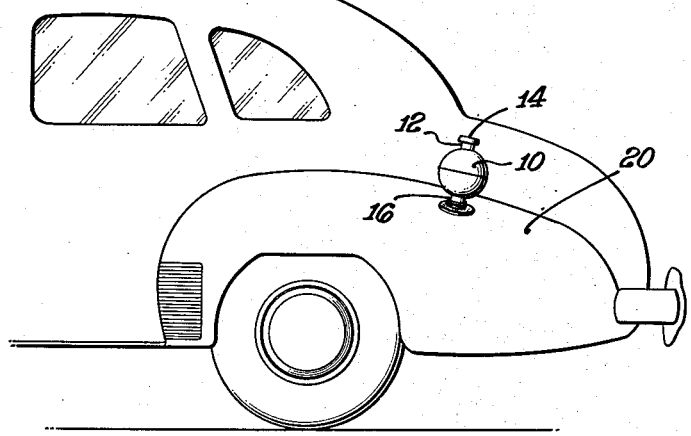
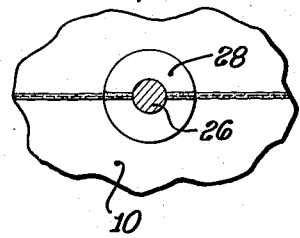
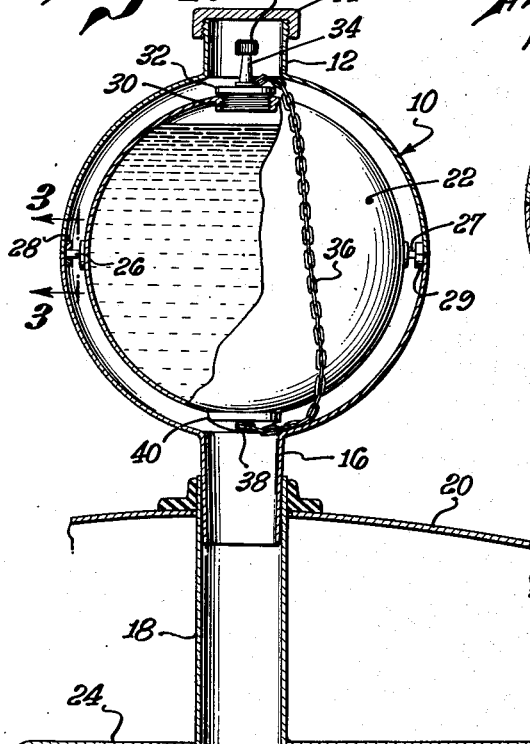
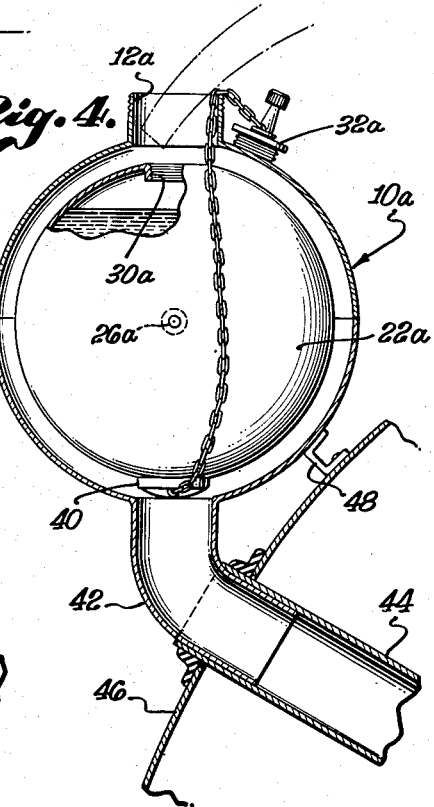
INVENTOR.
JOSEPH FRANKLIN,
BY
Edwin D. Jones
ATTORNEY.

Patented Jan. 6, 1953

2,624,400

UNITED STATES PATENT OFFICE 2,624,400

RESERVE FUEL TANK

Joseph Franklin, Los Angeles, Calif.

Application September 26, 1949, Serial No. 117,776

5 Claims. (Cl. 158—46.5)

My invention relates to reserve fuel tanks of the kind in which the reserve tank is positioned exteriorly of the main fuel tank but is adapted to be filled by the same filling operation as the main tank.

The invention is primarily intended for use with the tanks of automobiles but it is to be understood that it is not necessarily limited to such use.

It is a purpose of my invention to provide a reserve fuel tank mounted in the main tank filling conduit and fitted with its own filling cap but not requiring any manipulation other than the removal of the filling caps of the main and reserve fuel tanks to put the reserve tank in condition for use thus avoiding the necessity for supplementary valves and other control means for the operation of the reserve tank.

Another object or purpose of the invention is to provide a reserve fuel tank of such construction that it may be readily constructed as a fitting substituted for part of the standard filling conduit of automobile and other automotive vehicle tanks.

Still another object of my invention is to provide a reserve fuel tank of simple and inexpensive but rugged construction which is capable of giving trouble free service for an indefinite period since there are no parts subject to deterioration through excessive wear.

Still further features and objects of my invention will hereinafter appear from a study of the following specification read with reference to the accompanying drawings which illustrate an embodiment of the invention at present deemed preferable by me.

In the accompanying drawings:

Fig. 1 is a side view of the rear portion of a typical automobile fitted with the reserve fuel tank of my invention.

Fig. 2 is a central vertical section through the reserve tank arrangement shown in Fig. 1, and showing the connection between the reserve tank and the main tank, the view being drawn on a larger scale.

Fig. 3 is a fragmentary view showing the mounting means for the reserve tank and looking in the direction of the arrows 3—3 in Fig. 2.

Fig. 4 is a cross section taken at right angles to the view of Fig. 2 but showing the reserve tank structure mounted in a filler pipe carried more to the side of a rear fender than in Fig. 2, the view also shows both main tank and reserve tank being filled.

In Figs. 1 and 2, the numeral 10 indicates a housing which may conveniently be formed in two halves secured together around a median line.

The upper half of the housing is provided with a tubular filler extension or filling spout 12 preferably of the same diameter as standard automobile tank filler openings so that the conventional gas tank cap 14 may be utilized to normally close the extension 12.

The lower half of the housing is provided with a relatively long tubular extension or outlet pipe 16 preferably tapered from a diameter slightly less than the diameter of standard tank filler pipes 18, to a diameter slightly greater than that of the pipe 18 so that the housing tubular extension 16 will make a jam fit in the pipe 18.

It will be obvious that where sufficient space is available under the rear fender 20 of an automobile, the fender may be recessed to receive the housing.

Preferably as shown in the drawings the housing 10 is globular in form and the reserve tank 22 is of globular form of smaller diameter so that space is left between the outer surface of the reserve tank and the inner surface of the housing to provide a free flow of gasoline or other fuel round the reserve tank when filling the main tank 24.

The reserve tank 22 is rotatably mounted by pivots or trunnions 26, 27 secured thereto and received in bearing 28, 29 mounted on the inner wall of the housing.

The preferred construction of the bearings is shown in Fig. 3 and comprises rings split across a median line, one half of the bearing ring being secured to the upper half and the other half of the ring being secured to the lower half of housing 10, before the upper and lower parts of the housing are secured together after the globular reserve tank pivots have been positioned in the bearings. The pivotal mounting of the reserve tank are preferably arranged longitudinally of the vehicle to preclude movement of the tank when the vehicle is under way.

The reserve tank 22 is provided with a filling opening 30 of smaller diameter than the tubular extension 12, and a cap 32 is arranged to normally close the opening. In order to easily remove to cap 32 I provide the cap with an upstanding stem 34 extending into tubular member 12 and terminating in a knurled knob 35 which enables cap 32 to be readily removed by rotating knob 35 between thumb and forefinger after cap 14 of the housing has been taken off.

A further function performed by the stem 34 is to limit or check oscillation of the reserve tank about its pivots by the engagement of the stem with the walls of the tubular member 12.

In order to rotate the reserve tank 22 when it is desired to empty its contents into the main fuel tank I provide a length of chain 36 or other flexible member, secured at one end to the reserve tank opposite the filling opening thereof as indicated at 38 and secured at the other end to the cap 32. Sufficient slack is provided in the chain to enable the cap to be removed and suspended outside the tubular member 12 when filling the tanks, as indicated in Fig. 4.

A weight 40 is preferably secured to the reserve tank opposite its filling opening, in order to normally position the filling opening of the reserve tank in alignment with the filling opening of the housing, and one end of the chain 36 is conveniently secured to an eyelet secured in the weight.

The reserve tank construction shown in Fig. 4 differs from that of Fig. 2 only in that the reserve tank is adapted to be inserted into a fuel tank filler tube which is mounted in the side of the rear fender, parts identical with those of the construction shown in Fig. 2 are therefore indicated by the same reference numerals with the addition of the suffix "a" but the outlet 42 is shown as bent to an angle which enables it to be inserted into the main tank filler pipe 44 leading into the side of a rear fender 46.

If required the housing 10a may be steadied by a bracket 48 connecting the housing and fender and secured to them in any suitable manner.

Instead of a curved outlet pipe 42, a straight outlet pipe might be used fitting into an adaptor in the form of a curved length of pipe fitting into the main tank filler pipe 44.

It is pointed out that while the reserve fuel tank has been described with reference to its use on automobiles, it may also be fitted to the tanks of motor boats and used with fuel tanks of other types in which exhaustion of the main fuel supply is a common occurrence.

It will be evident that various changes and modifications may be made in the described embodiment of my invention by those skilled in the art without departing from the scope of my invention as intended to be defined by the appended claims.

What I claim is:

1. A reserve fuel tank, including: a housing having a bottom outlet and a top inlet; a tank mounted in the housing for rotation about a substantially horizontal fixed axis, and provided with an inlet opening; a weight on the tank tending to maintain the tank with its inlet opening in registry with the top inlet; means for rotating the tank into discharging position; and a member on the tank engaging the housing to limit oscillation of the tank on its axis and accessible through the top inlet for movement to a position which permits rotation of the tank to a discharging position by said means.

2. A reserve fuel tank, including: a housing having a bottom outlet and a top inlet; a tank mounted in the housing for rotation about a substantially horizontal fixed axis, and provided with an inlet opening; a weight on the tank tending to maintain the tank with its inlet opening in registry with the top inlet; means for rotating the tank into discharging position; and a closure for the inlet opening completely removable therefrom and having a member which when the closure is in closing relationship to the inlet opening, projects into the top inlet to engage the housing and limit oscillation of the tank on its axis, and providing means for removing and applying the closure from and to the inlet opening.

3. A reserve fuel tank, including: a housing having an outlet in its bottom, a filling spout for the housing fixed to and projecting upwardly therefrom; a tank rotatably mounted about a substantially horizontal fixed axis within the housing and provided with an inlet opening; a weight on the tank tending to maintain the tank with its inlet opening in registry with the filling spout; means for rotating the tank into discharging position; a screw threaded cap for closing the inlet opening connected to said means and completely removable from the inlet opening; a stem on said cap extending into the filling spout when said cap is in closing relationship to the inlet opening, to engage the filling spout and limit oscillation of the tank on its axis; and a head on the stem for rotating the cap to remove it from the inlet opening.

4. A reserve fuel tank; including: a globular housing having upper and lower halves, an outlet in the lower half and an inlet in the upper half; a pipe secured to the lower half at the outlet and of a diameter to be extendible into the filler pipe of a vehicle fuel tank and serving to support the housing on the filler pipe; a globular fuel tank of smaller radius than said housing and received in the housing; trunnions on said tank, and bearings for the trunnions on the inner side of the housing for supporting the tank in the housing for rotation about a substantially horizontal axis, each of said bearings in two parts with one part on the upper housing half and the other part on the lower housing half to allow mounting of the trunnions in the lower bearing parts before the upper half is secured to the lower half; said tank provided with an inlet opening; a weight on the tank tending to maintain the tank with its inlet opening in registry with the top inlet; means for rotating the tank into discharging position; and a cap for closing the inlet opening.

5. A reserve fuel tank; including: a globular housing having upper and lower halves, an outlet in the lower half and an inlet in the upper half; a pipe secured to the lower half at the outlet and of a diameter to be extendible into the filler pipe of a vehicle fuel tank and serving to support the housing on the filler pipe; a globular fuel tank of smaller radius than said housing and received in the housing; trunnions on said tank, and bearings for the trunnions on the inner side of the housing for supporting the tank in the housing for rotation about a substantially horizontal fixed axis, each of said bearings in two parts with one part on the upper housing half and the other part on the lower housing half to allow mounting of the trunnions in the lower bearing parts before the upper half is secured to the lower half; said tank provided with an inlet opening; a weight on the tank tending to maintain the tank with its inlet opening in registry with the top inlet; means for rotating the tank into discharging position; and a closure for the inlet opening completely removable therefrom and having a member projecting into the housing inlet to engage the housing and limit oscillation of the tank on its trunnions when the closure is in closing relationship to the inlet opening, and providing means for removing and applying the closure.

JOSEPH FRANKLIN.

REFERENCES CITED

The following references are of record in the file of this patent:

UNITED STATES PATENTS

| Number | Name | Date |
|---|---|---|
| 965,196 | Kellogg | July 26, 1910 |
| 1,343,173 | Ipshording et al. | June 8, 1920 |
| 1,855,388 | Du Bois | Apr. 26, 1922 |
| 2,103,516 | Dempsey | Dec. 28, 1937 |